(12) United States Patent
Rice

(10) Patent No.: US 8,579,303 B2
(45) Date of Patent: Nov. 12, 2013

(54) PORTABLE CHAIR CARRIER ON ROLLERS

(76) Inventor: Lisa Rice, Anderson, IN (US)

( * ) Notice: Subject to any disclaimer, the term of this patent is extended or adjusted under 35 U.S.C. 154(b) by 567 days.

(21) Appl. No.: 12/497,599

(22) Filed: Jul. 3, 2009

(65) Prior Publication Data

US 2011/0001298 A1     Jan. 6, 2011

(51) Int. Cl.
*B62B 1/12*     (2006.01)
(52) U.S. Cl.
USPC ..................................... 280/47.26; 280/79.2
(58) Field of Classification Search
USPC .............. 280/79.2, 79.5, 47.18, 47.24, 47.26
See application file for complete search history.

(56) References Cited

U.S. PATENT DOCUMENTS

| | | | |
|---|---|---|---|
| 1,276,322 A | | 8/1918 | Bullock |
| 2,817,538 A | * | 12/1957 | Romang .................... 280/47.26 |
| 2,840,142 A | | 6/1958 | Huag |
| 3,276,786 A | | 10/1966 | Olander |
| 3,997,213 A | | 12/1976 | Smith et al. |
| 4,593,841 A | * | 6/1986 | Lange ........................... 224/153 |
| 4,887,837 A | * | 12/1989 | Bonewicz et al. ............ 280/654 |
| 5,244,219 A | * | 9/1993 | Hadlum ..................... 280/47.26 |
| 5,265,894 A | * | 11/1993 | Dunn ......................... 280/47.26 |
| 5,630,602 A | | 5/1997 | Vanderslice |
| 5,924,709 A | * | 7/1999 | Yang .......................... 280/47.26 |
| 6,053,516 A | * | 4/2000 | Ottaway ....................... 280/79.5 |
| 6,056,301 A | * | 5/2000 | Berliner et al. ............. 280/43.1 |
| 6,164,425 A | * | 12/2000 | Latshaw ...................... 190/18 A |
| 6,279,926 B1 | * | 8/2001 | Taube et al. .................... 280/37 |
| 6,814,361 B2 | * | 11/2004 | Tsu ............................. 280/43.1 |
| 7,322,585 B2 | * | 1/2008 | Handelman et al. ........ 280/47.26 |
| 7,384,050 B2 | * | 6/2008 | Blum et al. ................ 280/47.26 |
| 7,416,195 B2 | * | 8/2008 | Zwack ....................... 280/47.24 |
| 7,540,508 B2 | * | 6/2009 | Shragge ..................... 280/47.33 |
| 7,686,164 B2 | * | 3/2010 | Quartarone et al. ....... 206/315.7 |
| 7,726,671 B2 | * | 6/2010 | Musi .......................... 280/47.26 |
| 2002/0074754 A1 | * | 6/2002 | Tan ............................ 280/47.26 |
| 2004/0100046 A1 | * | 5/2004 | Darling .......................... 280/30 |
| 2004/0104550 A1 | * | 6/2004 | Do ............................. 280/47.26 |
| 2004/0178591 A1 | * | 9/2004 | Rockow ..................... 280/47.26 |
| 2005/0023781 A1 | * | 2/2005 | Ortega ....................... 280/47.24 |
| 2005/0029762 A1 | * | 2/2005 | Chen .......................... 280/47.24 |
| 2005/0140103 A1 | * | 6/2005 | Marchant et al. .......... 280/47.26 |
| 2005/0161893 A2 | * | 7/2005 | Darling .......................... 280/30 |
| 2006/0119057 A1 | * | 6/2006 | Russo ........................ 280/47.18 |
| 2006/0175782 A1 | * | 8/2006 | Shin et al. .................. 280/47.26 |
| 2006/0267301 A1 | * | 11/2006 | Tuntland .................... 280/47.26 |
| 2008/0093238 A1 | * | 4/2008 | Handelman et al. ..... 206/315.91 |
| 2010/0237576 A1 | * | 9/2010 | Maccario .................. 280/47.26 |

* cited by examiner

*Primary Examiner* — Jeffrey J Restifo
(74) *Attorney, Agent, or Firm* — John D Ritchison

(57) ABSTRACT

A Portable Chair Carrier on Rollers device for use with sporting goods and outdoor accessories. Particularly this device mounts a wheel assembly to a soft carrying case. The mounting may be as an original equipment feature with the case or as an add-on feature to existing cases. It is comprised essentially of a case that has several features, a wheel support structure to support wheels, a means for securing the wheels to the case and a support stand permits the device to maintain an upright position a support.

8 Claims, 4 Drawing Sheets

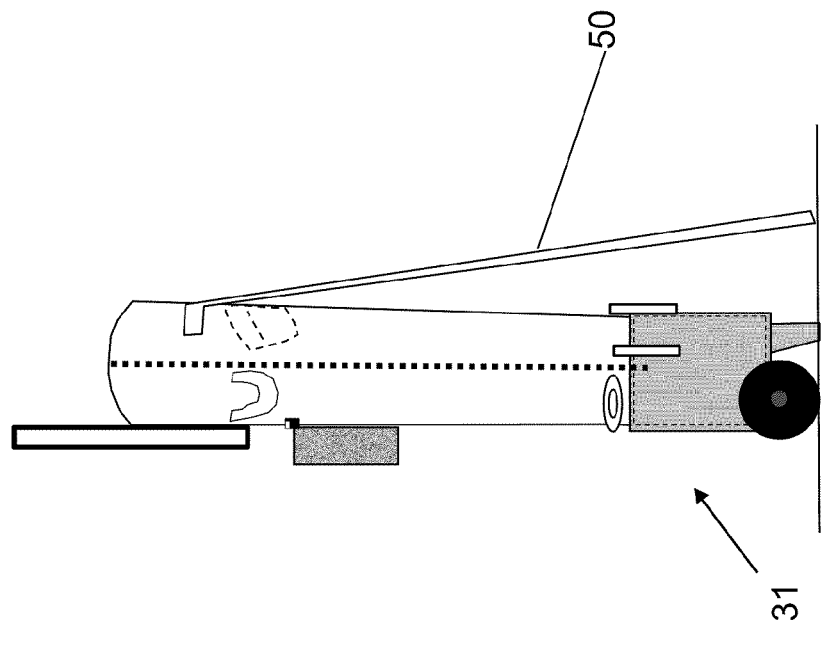
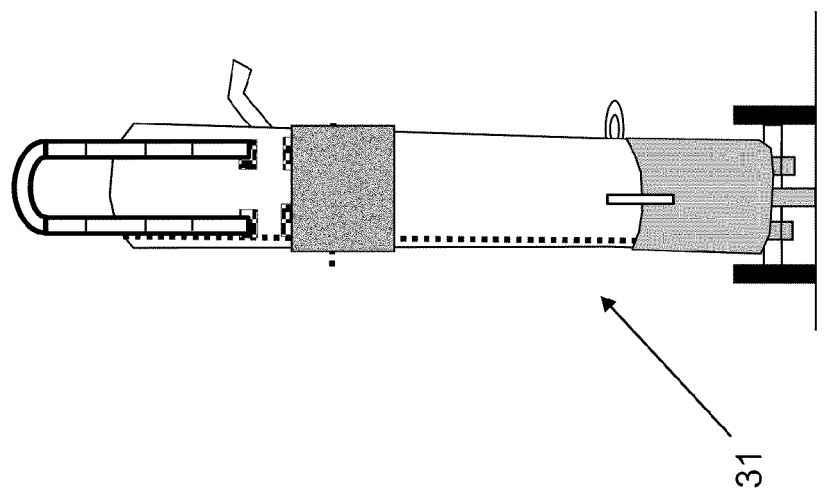

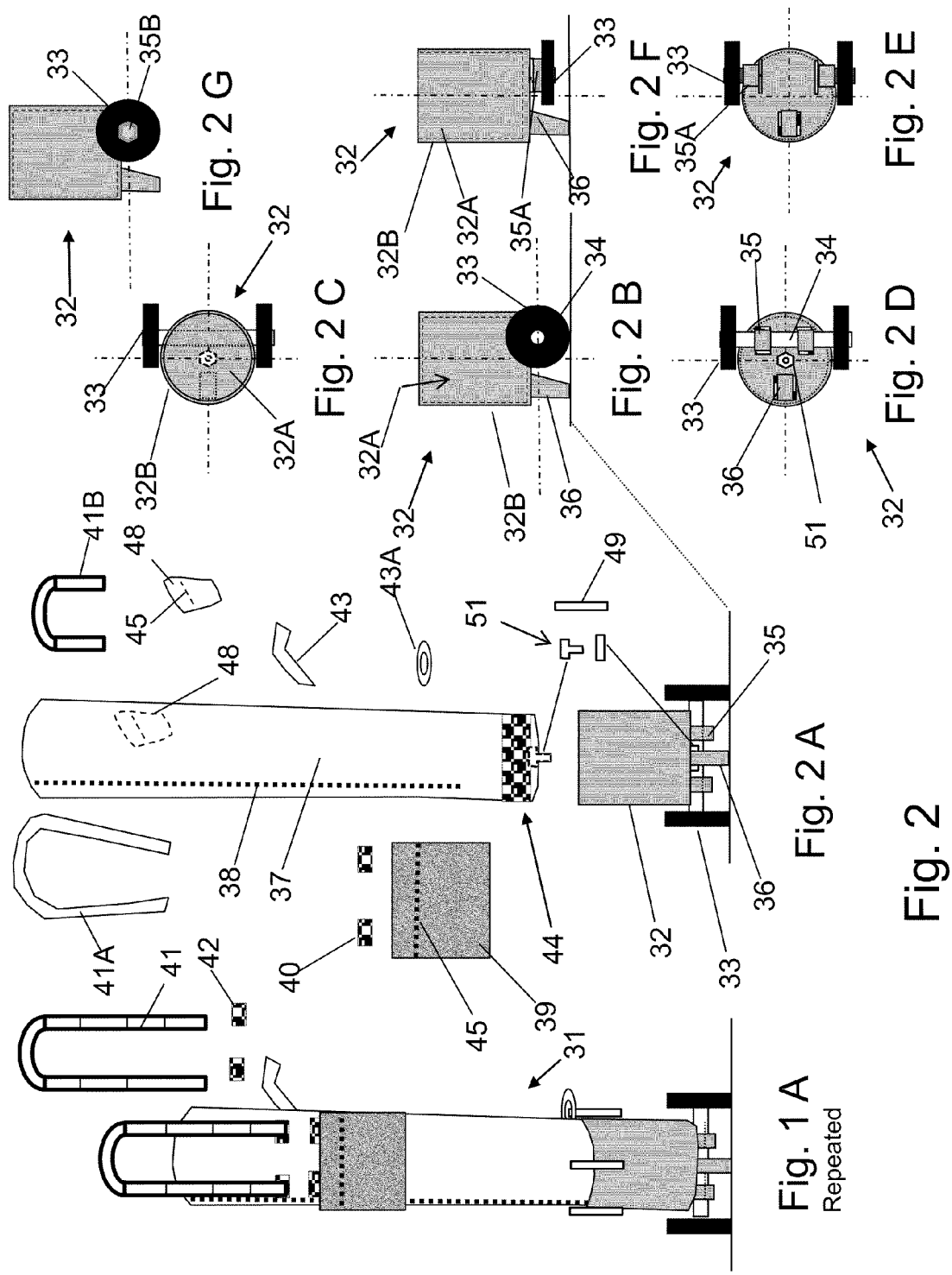

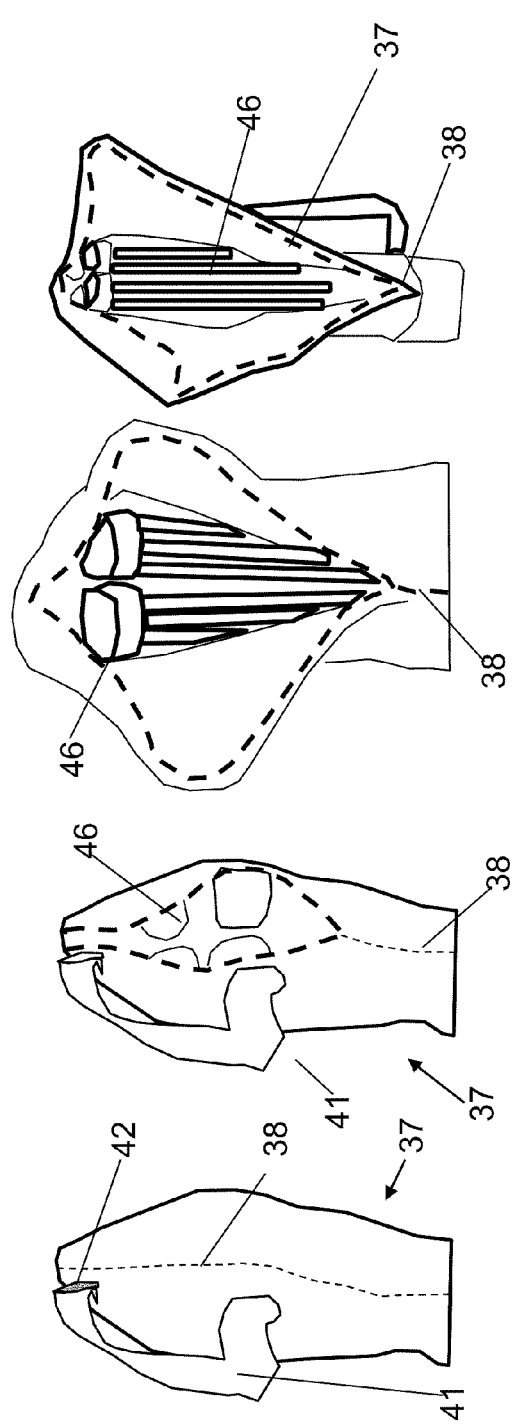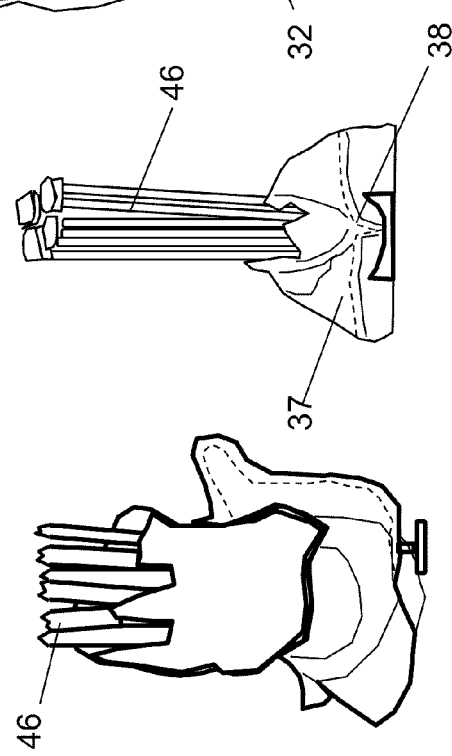

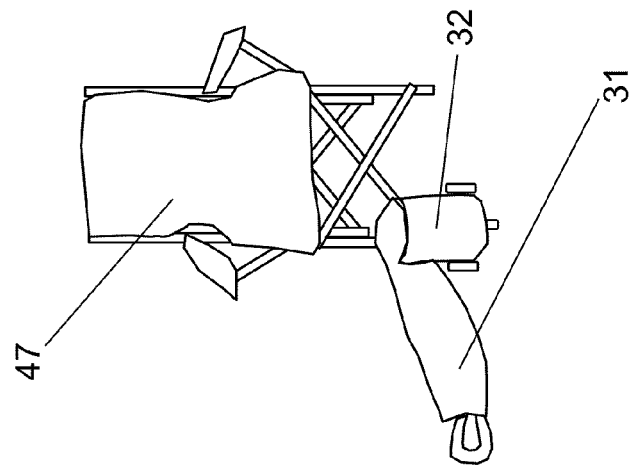
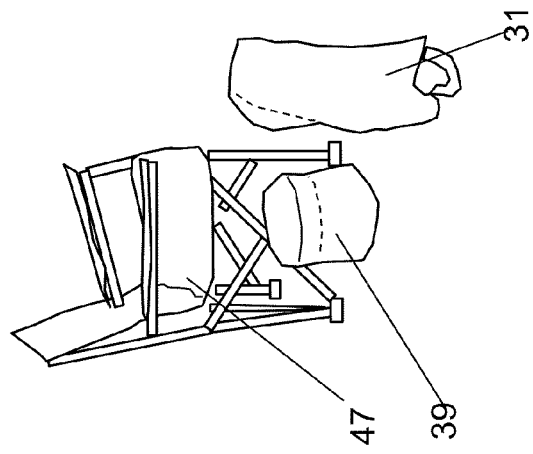
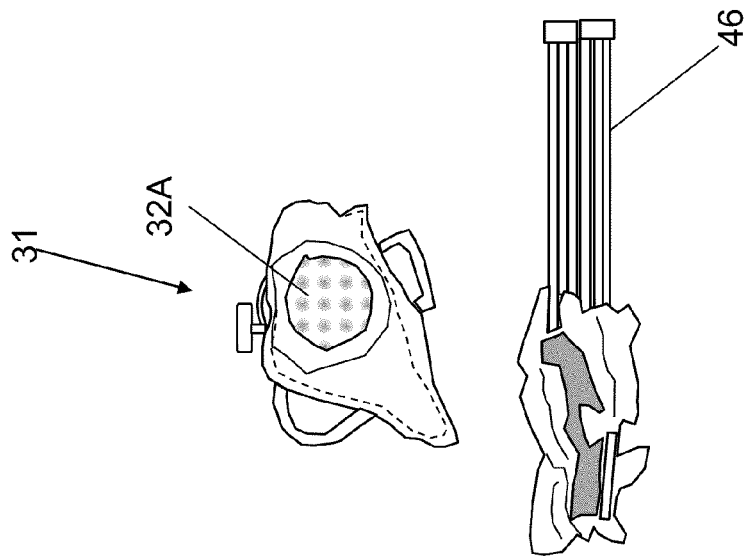
Fig. 4

PORTABLE CHAIR CARRIER ON ROLLERS

CROSS-REFERENCE TO RELATED APPLICATIONS

None

FIELD OF INVENTION

This invention relates to a Portable Chair Carrier on Rollers for use with sporting goods and outdoor accessories. Specifically, the Portable Chair Carrier on Rollers, called a Roll-N-Go, is an improvement to current "soft" carrying cases for fold-up chairs, tables, tripods and other accessories used in the outdoors and for sporting goods. Particularly this new Special Roll-a-Chair Device is related to devices and methods to mount a wheel assembly to a soft carrying case. The mounting may be as an original equipment feature with the case or as an add-on feature to existing cases. The user benefits in many ways with the case now having wheels for transport across ground or pavement.

FEDERALLY SPONSORED RESEARCH

None.

SEQUENCE LISTING OR PROGRAM

None.

BACKGROUND AND NEEDS

The use of portable chairs at outdoor events, such as concerts and sporting events, has become a widespread activity for the spectators and players. Often bleachers and other means of seating are either not provided or over-crowded. Likewise, when going to these events a person may wish to take along drinks, food and other items. The portable chairs are often collapsible and placed into a carrying case. However the case is awkward and heavy to carry, provides no room for drinks and other items, and forces the user to make multiple trips. Further, the user that carries the chair device may suffer from back aches or may have a health condition that does not lend to the user carrying items at all.

As far as known, there are no other Portable Chair Carrier on Rollers, called a Roll-N-Go with wheels or equivalents at the present time which fully meet these need with as few of components and simple installation as the present Portable Chair Carrier on Rollers, called a Roll-N-Go Device. It is believed that this device is made with few parts, of a durable design, and with little expense as compared to other transportable case assemblies or add-on features.

PRIOR ART

The historical technology focused on devices that only helped carry packages and items to a store or at a beach. Examples of prior carrying devices begins with U.S. Pat. No. 1,276,322 issued to Bullock (1917) and entitled "Bag Carrier". This device was a two-wheeled cart with a wagon-like handle. It was not collapsible or closeable for carrying items. It appears awkward at best and of more complex design when compared to the simple Portable Chair Carrier on Rollers, called a Roll-N-Go device. A further example of a carrying device is shown in U.S. Pat. No. 2,840,142 (1958) by Haug and entitled "Foldable Beach Cart". It taught an apparatus for Carrying beach items and flat chairs. It was non-compact and awkward in use compared to the new device presented herein.

Another example of a carrying device is shown by Olander in U.S. Pat. No. 3,276,786 (1964) and entitled "Nestable Shopping Cart". This taught use for shopping with no closure or compactness when compared to the Portable Chair Carrier on Rollers, called a Roll-N-Go device. Other examples of a carrying device is shown by Smith et al in U.S. Pat. No. 3,997,213 (1976) and entitled "Collapsible Carry-all with Seat". This device disclosed a combination wheeled chair with a loose fabric shelf under the seat. It does not anticipate or compare structurally or in use with the new Portable Chair Carrier device.

A more recent prior art device is a combination shelf and cart shown in U.S. Pat. No. 4,887,837 (1989) issued to Bonewicz, Jr. et al. This device shows shelf and carrying bag but does not show or anticipate the new, simple construction of the Rice application. Finally, another beach carrier is shown in U.S. Pat. No. 5,630,602 (1997) issued to Vanderslice, et al. This shows a flat bag-like and wheel combination again for flat chairs and the like. It does not anticipate or serve for collapsible folding chairs as shown in the Portable Chair Carrier on Rollers, called a Roll-N-Go device.

SUMMARY OF THE INVENTION

A Portable Chair Carrier on Rollers, called a Roll-N-Go has been developed for use by a person to improve a soft carrying case and make it transportable with wheels across the ground or hard pavement. Specifically, the Special Roll-a-Chair Device provides an economical, efficient and easy way to transport a soft carrying case. It is ergonomically correct and prevents the need for a person of any stature to lift and carry a relatively heavy and bulky case. The wheeled features permit one to pull and roll the case easily and safely during its transportation.

The preferred embodiment of the device is comprised essentially of two main parts: The first part is a case which may be original equipment or an existing case. The case has several features which may be added to a standard soft case. The second part is a wheel support structure with a means to provide and to support wheels and means to secure itself to the case. It has multiple embodiments with the preferred embodiment comprising fixed wheel supports and a means to stabilize the whole assembly when the case and wheel support are positioned essentially vertical to the horizon or surface. As mentioned, the device may have alternative embodiments described below.

The newly invented Portable Chair Carrier on Rollers, called a Roll-N-Go features very few parts. In operation, the new device may be easily and quickly affixed to soft carrying cases with simple hand tools for fasteners or adhesive means to secure.

OBJECTS AND ADVANTAGES

There are several objects and advantages of the Portable Chair Carrier on Rollers called a Roll-N-Go. There are currently no known wheeled soft carrying cases that exist or that are effective at providing the objects of this invention.

The following TABLE A summarizes various advantages and objects of the Portable Chair Carrier on Rollers called a Roll-N-Go. This list is exemplary and not limiting to the many advantages offered by this new device.

TABLE A

Various Advantages and Objects

| Item | Description of Advantage and Object |
|---|---|
| 1 | Is easy to install with existing soft carrying cases. |
| 2 | May be part of original equipment with chair cases and the like. |
| 3 | Improves the ergonomics of transporting fold-up devices such as chairs, tables, tripods and the like. |
| 4 | Provides easily added features such as handles, accessory bag and umbrella loops. |
| 5 | Is durable. |
| 6 | May be used across grassy ground, dirt or paved surfaces. |
| 7 | Can be economically manufactured and has an economy of scale since it may fit various manufacturers product. |
| 8 | Is versatile in that the configuration may be made from various materials and in various sizes. |
| 9 | Is Light weight. |
| 10 | Permits the case to be "stood-up" essentially vertical to the ground surface. |
| 11 | Has a wide market for use - outdoors camping, hiking, fishing and the like; sporting events; outdoor concerts and the like. |
| 12 | Is affordable. |
| 13 | Is simple. |

Finally, other advantages and additional features of the present Portable Chair Carrier on Rollers called a Roll-N-Go will be more apparent from the accompanying drawings and from the full description of the device. For one skilled in the art of carrying and roller devices and improvements, it is readily understood that the features shown in the examples with this mechanism are readily adapted for improvement to other types of carrying systems.

DESCRIPTION OF THE DRAWINGS

Figures

The accompanying drawings, which are incorporated in and constitute a part of this specification, illustrate a preferred and alternative embodiments for the Portable Chair Carrier on Rollers called a Roll-N-Go. The drawings together with the summary description given above and a detailed description given below serve to explain the principles of the Portable Chair Carrier on Rollers. It is understood, however, that the device is not limited to only the precise arrangements and instrumentalities shown.

FIGS. 1A and B are front and side sketches of the Portable Chair Carrier on Rollers, called a Roll-N-Go.

FIGS. 2A through 2G are sketches of the Portable Chair Carrier on Rollers, called a Roll-N-Go with the various components and features noted.

FIG. 3A through 3H are sketches of the preferred embodiment of the Portable Chair Carrier on Rollers, called a Roll-N-Go as it is being used in various stages of encasing an object.

FIGS. 4A through 4C are sketches that show the Portable Chair Carrier on Rollers, called a Roll-N-Go with its contents being removed and set-up for use.

DESCRIPTION OF THE DRAWINGS

Reference Numerals

The following list refers to the drawings:

| Ref # | Description |
|---|---|
| 31 | A general Portable Chair Carrier on Rollers, called a Roll-N-Go |
| 32 | Wheel support structure |
| 32A | Interior compartment of the wheel support structure |
| 32B | Exterior of container of the wheeled support structure |
| 33 | Wheel(s) |
| 34 | Shaft |
| 35 | Shaft support means |
| 35A | Foldable shaft support means |
| 35B | Removable shaft support means |
| 36 | Front Stabilizer support |
| 37 | Case (for foldable chair or the like) |
| 38 | Case closing means - zipper, snaps Velcro or the like |
| 39 | Accessory bag (thermos, cans, apparel or the like - insulated or not |
| 40 | Means to secure accessory bag |
| 41 | Handle means - telescopic or the like |
| 41A | Handle means - soft loop "U" or the like |
| 41B | Handle means - hard "U" or the like |
| 42 | Means to secure handle means 41 to case 37 |
| 43 | Umbrella open able/re-closable band |
| 43A | Umbrella lower loop |
| 44 | Means to secure case 37 to wheel support 32 |
| 45 | Means to close accessory bag or auxiliary pocket - zipper, snaps Velcro or the like |
| 46 | Contents of case - foldable chair, table stand. Sport (tennis racquets) items or the like |
| 47 | Contents of case expanded and set-up for use, such as a chair or the like |
| 48 | Enclosed auxiliary pocket into case 37 interior for relatively smaller items |
| 49 | Means to secure case to support (snaps, loop and hook [Velcro ®] or the like) |
| 50 | Optional support stand such as metal, composite material or plastic forks or the like |
| 51 | Means to secure bottom of case 37 to container 32 |

DETAILED DESCRIPTION OF PREFERRED EMBODIMENT

The present mechanism is a Portable Chair Carrier on Rollers, called a Roll-N-Go that has been developed for use by a person to improve a soft carrying case by providing wheels to enhance transportability of the case. The preferred embodiment of the device is comprised essentially of two main parts: The first part is a case 37 which may be original equipment or an existing case. The case 37 has several features which may be added to a standard soft case. The second part is a wheel support structure 32 with a means to provide and to support wheels and means to secure itself to the case. It has multiple embodiments with the preferred embodiment comprising fixed wheel supports 35 and a means to stabilize 36 the whole assembly when the case 36 and wheel support 32 are positioned essentially vertical to the horizon or surface. As mentioned, the device may have alternative embodiments described below.

The improvement over the existing art is providing a device that:
1 Is easy to install with existing soft carrying cases.
2 May be part of original equipment with chair cases and the like.
3 Improves the ergonomics of transporting fold-up devices such as chairs, tables, tripods and the like.

4 Provides easily added features such as handles, accessory bag and umbrella loops.
5 Is durable.
6 May be used across grassy ground, dirt or paved surfaces.
7 Can be economically manufactured and has an economy of scale since it may fit various manufacturers product.
8 Is versatile in that the configuration may be made from various materials and in various sizes.
9 Is Light weight.
10 Permits the case to be "stood-up" essentially vertical to the ground surface.
11 Has a wide market for use—outdoors camping, hiking, fishing and the like; sporting events; outdoor concerts and the like.
12 Is affordable.
13 Is simple.

There is shown in FIGS. 1-4 a complete operative embodiment and method to operate the Portable Chair Carrier on Rollers, called a Roll-N-Go 31. In the drawings and illustrations, one notes well that the FIGS. 1 and 2 demonstrate the general configuration and FIGS. 3 and 4 show the use of this invention. The preferred embodiment of the device is comprised of only a few parts as shown in the sketches.

The accompanying drawings, which are incorporated in and constitute a part of this specification, illustrate an embodiment of the Portable Chair Carrier on Rollers, called a Roll-N-Go 31 that is preferred. The drawings together with the summary description given above and a detailed description given below serve to explain the principles of the Portable Chair Carrier on Rollers, called a Roll-N-Go 31. It is understood, however, that the Portable Chair Carrier on Rollers, called a Roll-N-Go device 31 is not limited to only the precise arrangements and instrumentalities shown. This is exemplified with the described alternative embodiments.

FIGS. 1A and B are front and side sketches of the Portable Chair Carrier on Rollers, called a Roll-N-Go device 31. Most of the components and features are described below in FIGS. 2A to G. Optional support stand 50 made of (for example and not limitation) metal, composite material or plastic forks or the like is shown in the side view FIG. 1B.

FIGS. 2A through 2G are sketches of the Portable Chair Carrier on Rollers, called a Roll-N-Go device 31 with the various components and features noted. Note the repeated sketch FIG. 1A is shown on the same page for ease of reference to the Portable Chair Carrier on Rollers, called a Roll-N-Go device 31. FIG. 2A shows the various components and features of the Portable Chair Carrier on Rollers, called a Roll-N-Go device 31. The wheeled support structure 32 is shown from a front view with the one or more wheels 33, shaft support means 35 and stabilizer support 36. The configuration and materials are described further in other sketches. The carrying case 37 is shown with a means to close 38 such as a zipper, snaps, mechanical fasteners, hook and loop such as Velcro™ or the like. The case 36 has a means to connect 44 to the wheel support interior. This may be by various methods such as, but not limited to, mechanical fasteners such as pop-rivets, threaded bolt and nuts, barbed drivers, etc; chemical materials such as an adhesive, glue, multi-part epoxy; and other joining processes such as heat sealing, friction welds and the like. The case 36 itself is an elongated enclosure made of, for example and not limitation, canvas, polyester, nylon, denim, cotton, or a composite material of suitable durability and strength to contain and permit carrying a folded chair, table, tripod or the like. With the development of composite materials, one skilled in the art of suitable materials for cases well appreciates the plethora of current and future materials that are within the scope of the present Portable Chair Carrier on Rollers, called a Roll-N-Go device 31.

FIG. 2A continues to show features of the new device 31. Accessories and features include the accessory bag 39 with a means to close 45 such as a zipper, snaps, mechanical fasteners, hook and loop such as Velcro™ or the like. Also shown is a means to attach 40 the bag 39 to the case 37. The means 40 to secure could be similar to described above. This again may be by various methods such as, but not limited to, mechanical fasteners such as pop-rivets, threaded bolt and nuts, barbed drivers, etc; chemical materials such as an adhesive, glue, multi-part epoxy; and other joining processes such as heat sealing, friction welds and the like. Optional securement snaps 49 may be utilized. The accessory bag 39 itself may be made of various materials similar to the case 37. The materials suitable for the case 37 are incorporated here by reference as if repeated verbatim as also suitable for the accessory bag 39. Additionally, the accessory bag 39 might have waterproof features and insulation materials to allow for carrying cold and hot contents such as beverages or food stuffs. The accessory bag 39 anticipates having an open able and closeable means 45 such as a zipper, hook and loop, snaps or the like.

Other features shown in FIG. 2A are a telescopic handle means 41. An alternative handle may be a soft loop of material Optional support stand such as metal, composite material or plastic forks or the like 41A or a "U" shaped hard material handle 41B. The attachment means 42 for attaching the handle 41 to the case 37 would be similar to those described for means 40 and 42 described above. The features of an umbrella strap 43 and lower umbrella loop 43A are similar to those featured for golf bags and the like. Finally, an enclosed auxiliary pocket 48 sewn or placed into case 37 interior allows storage or placement of relatively smaller items to the chair or table. Keys, utensils, dry foodstuffs and the like might be placed here by a user. The pocket 48 would feature a means to close auxiliary pocket such as a zipper, snaps Velcro or the like FIG. 2B shows the wheeled support structure 32 from a side view with the wheels 33, shaft support means 35, shaft 34 and "shadow" of the stabilizer support 36. The main part of the wheel support structure 32 is the container 32C with an open interior cavity 32A. The container is similar to an open can with sides and a bottom but no lid. The support has integral or attached features of the shaft support means 35 and the stabilizer support 36. One skilled in manufacturing appreciates that the entire wheel support structure 32 featuring the container 32B and the interior 32A might be molded or cast integrally with the shaft supports 35 and the stabilizer 36. This would be appropriate for molded plastics and composite materials or pot metals such as aluminum, pewter and the like. As a less preferred option, the container 32B with the interior 32A might be molded, cast or extruded from the same materials or other metals such as sheet steel. Then the shaft support 35 and the stabilizer 36 would need to be assembled with the container 32B and fastened securely by a means to provide the fully configured wheel support structure 32.

FIGS. 2C and 2D show a top view and bottom view of the wheel support structure 32 respectively. The configuration, fastening or integration and materials are as described for FIG. 2B. In addition, in FIGS. 2A, C and D an optional securement means 51 such as a threaded fastener or the like is shown to secure the case 36 to the case support 32.

FIGS. 2E and 2F show a top view and bottom view respectively of an alternative embodiment for the wheel support structure 32. This alternative shows a foldable wheel 33 using a hinged or foldable support means 35A. Materials are similar to described above. These sketches are centered on the wheel support structure 32. The components and features shown are the wheels 33, the shaft 34, the wheel support means 35, and the front stabilizer structure 36. The wheel support structure 32 is shown attached to the case 37 by a means to secure 44 (not shown in this view).

The configuration and materials for these components and features are as described above. While the preferred embodiment of the Portable Chair Carrier on Rollers, called a Roll-N-Go device 31 anticipates a full integration of the wheel support structure 32 with the case 37, an alternative embodiment is considered. Within the scope and spirit of this concept is a stand alone wheel structure 32 that may be an added feature. This means the alternative embodiment may be a stand alone wheel support structure 32 that is sold for securing to an existing chair case 37.

FIGS. 3A through 3H are sketches of the preferred embodiment of the Portable Chair Carrier on Rollers, called a Roll-N-Go as it is being used in various stages of encasing an object. FIGS. 4A through 4C are sketches that show the Portable Chair Carrier on Rollers, called a Roll-N-Go with its contents being removed and set-up for use. These are further described in the Operation Section, below.

For almost all of the drawings shown above, one skilled in the art of manufacturing carrying cases and wheeled devices also appreciates that depending on the materials, the case assembly 37 and wheel structure 32 may be produced from a plethora of materials and with many fastening and enclosure means. The case 37 might be made of, for example and not limitation, nylon fabric, canvas, rayon, composite material fabric, denim fabric and the like. Finally, various surface preparations and coatings may be desired to enhance water proofing or to eliminate or minimize corrosion sometimes accompanying devices used outdoors.

All of the details mentioned here are exemplary and not limiting. Other specific components specific to describing a Portable Chair Carrier on Rollers, called a Roll-N-Go device 31 may be added as a person having ordinary skill in the field of carrying cases and wheeled devices well appreciates.

OPERATION OF THE PREFERRED EMBODIMENT

The new Portable Chair Carrier on Rollers, called a Roll-N-Go device 31 has been described in the above embodiment. The manner of how the device operates is described below. One skilled in the art of carrying cases and wheeled hitching devices will note that the description above and the operation described here must be taken together to fully illustrate the concept of the Portable Chair Carrier on Rollers, called a Roll-N-Go device 31. The preferred embodiment of the device is comprised essentially of two main parts: The first part is a case 37 which may be original equipment or an existing case. The case 37 has several features which may be added to a standard soft case. The second part is a wheel support structure 32 with a means to provide and to support wheels and means to secure itself to the case. It has multiple embodiments with the preferred embodiment comprising fixed wheel supports 35 and a means to stabilize 36 the whole assembly when the case 36 and wheel support 32 are positioned essentially vertical to the horizon or surface. The newly invented Portable Chair Carrier on Rollers, called a Roll-N-Go device 31 features very few parts. In operation, the new device may be easily and quickly affixed to soft carrying cases with simple hand tools for fasteners or adhesive means to secure.

FIGS. 3A through 3H are sketches of the preferred embodiment of the Portable Chair Carrier on Rollers, called a Roll-N-Go 31 as it is being used in various stages of encasing an object 46. FIG. 3A has the case 37 fully closed by the zipper like means 38. FIG. 3B shows the case 37 beginning to open. FIG. 3C demonstrates the case 37 clearly open and the contents 46 beginning to show. FIG. 3D shows the case 37 open and the zipper-like means 38 almost extend fully open. FIGS. 3E and 3F show the contents 46 almost free of the case 37. FIG. 3G shows the zipper-like means 38 of the case 37 fully open. FIG. 3H shows the case 37 folded around the wheeled support structure 32 (hidden) with the contents 46 fully removed.

FIGS. 4A through 4C are sketches that show the Portable Chair Carrier on Rollers, called a Roll-N-Go 31 with its contents 46 FIG. 4A is the contents 46 removed and separate from the device 31. FIG. 4B shows the device 31 and the accessory bag 39 separate from the assembled or unfolded contents, a chair 47. FIG. 4C repeats the showing of the chair 47 and the device 31 from a different vantage point.

There are many potential uses for this device with the carrying case industry as described herein. However, these describe uses are exemplary and not intended as a limitation of anticipated uses for the Special Roll-a-Chair Device 31. The following TABLE B shows additional examples of potential uses.

TABLE B

| POSSIBLE USES - Transportation of foldable chairs, tables, camera tripods, tennis racquets and the like at: | |
|---|---|
| ITEM | DESCRIPTION |
| 1 | Outdoor events such as camping, hiking, fishing and the like. |
| 2 | Outdoor spectator or participant sporting events such as soccer, football, baseball, softball, volley ball swimming and the like |
| 3 | Outdoor concerts and music shows |
| 4 | Festivals and town heritage days and the like |
| 5 | Events where older individuals or individuals with medical conditions frequently require means to be seated. |
| 6 | Carrying case for tennis racquets, etc. with or without foldable chair |

With this description it is to be understood that the Portable Chair Carrier on Rollers, called a Roll-N-Go device 31 is not to be limited to only the disclosed embodiment. The features of the Portable Chair Carrier on Rollers, called a Roll-N-Go device 31 are intended to cover various modifications and equivalent arrangements included within the spirit and scope of the description.

What is claimed is:
1. A Portable Chair Carrier device (31) comprised of:
(a) a case (36) with a top and a bottom and an outer surface that has several specific features including:
  i) the case is made of a soft, waterproof, and durable material;
  ii) the case has an insulated accessory bag (39) with said bag having a means for removably attaching the accessory bag to the case;
  iii) the case has an auxiliary closable pocket (48) integrally attached to the case;
  iv) the case has a longitudinal access opening down a front surface essentially from the top to the bottom; and
  v) the case has a means for opening and closing the access opening;
(b) a means for providing a pull-able handle (41);

(c) a wheel support structure (32) with a means for providing and supporting at least one wheel;

(d) a means for securing the wheel support structure to the case; and (e) a support stand (50)

wherein the special device (31) may be used to encase and provide a wheeled carrying means for a plurality of collapsible chairs, tables, tripods and other accessories used in the outdoor concerts and closing means permits full, frontal access to the interior of the case.

2. The device according to claim 1 wherein the means for providing a pull-able handle is of a telescopic configuration.

3. The device according to claim 1 wherein the means for providing a pull-able handle is comprised of a soft, durable and flexible material strap.

4. The device according to claim 1 wherein the wheel support structure is comprised of a fixed pair of wheels.

5. The device according to claim 1 wherein the wheel support structure is comprised of a removable pair of wheels.

6. The device according to claim 1 wherein the wheel support structure is comprised of a foldable pair of wheels.

7. The device according to claim 1 wherein the means to secure the wheel support to the case is an adhesive placed between the exterior of the case (36) and the interior of the support (32B).

8. A Portable Chair Carrier device (31) comprised of:

(a) a case (36) with a top and a bottom and an outer surface that has several specific features including:
   i) the case is made of a durable nylon with a waterproof surface;
   ii) the case has an insulated accessory bag (39) with said bag having a means for removably attaching the accessory bag to the case;
   iii) the case has an auxiliary closable pocket (48) integrally attached to the case;
   iv) the case has a longitudinal access opening down a front surface essentially from the top to the bottom; and
   v) the case has a zipper for opening and closing the access opening;

(b) a means for providing a pull-able handle (41);

(c) a wheel support structure (32) with a means for providing and supporting at least one wheel;

(d) an adhesive material placed between the exterior of the case (36) and the interior of the support (32B) for securing the wheel support structure to the case; and (e) a support stand (50)

wherein the special device (31) may be used to encase and provide a wheeled carrying means for a plurality of collapsible chairs, tables, tripods and other accessories used in the outdoor concerts and closing means permits full, frontal access to the interior of the case.

* * * * *